US009805221B2

(12) United States Patent
Sastry et al.

(10) Patent No.: US 9,805,221 B2
(45) Date of Patent: Oct. 31, 2017

(54) INCORPORATING ACCESS CONTROL FUNCTIONALITY INTO A SYSTEM ON A CHIP (SOC)

(75) Inventors: Manoj R. Sastry, Portland, OR (US); Ioannis T. Schoinas, Portland, OR (US); Robert J. Toepfer, Portland, OR (US); Alpa T. Narendra Trivedi, Hillsboro, OR (US); Men Long, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 13/995,659

(22) PCT Filed: Dec. 21, 2011

(86) PCT No.: PCT/US2011/066355
§ 371 (c)(1),
(2), (4) Date: Dec. 17, 2013

(87) PCT Pub. No.: WO2013/095411
PCT Pub. Date: Jun. 27, 2013

(65) Prior Publication Data
US 2014/0137231 A1   May 15, 2014

(51) Int. Cl.
*G06F 21/76* (2013.01)
*G06F 13/38* (2006.01)

(52) U.S. Cl.
CPC ............ *G06F 21/76* (2013.01); *G06F 13/385* (2013.01)

(58) Field of Classification Search
CPC .......................................... G06F 21/70–21/78
See application file for complete search history.

(56) References Cited

U.S. PATENT DOCUMENTS

| 7,392,546 | B2 * | 6/2008 | Patrick | G06F 21/6245 709/217 |
| 7,484,081 | B1 * | 1/2009 | Langhammer | G06F 21/76 326/8 |
| 8,977,863 | B1 * | 3/2015 | Arsintescu | G06F 21/76 713/189 |
| 2002/0199110 | A1 * | 12/2002 | Kean | G06F 17/5054 713/189 |
| 2005/0256992 | A1 | 11/2005 | Chalopin et al. | |
| 2006/0075374 | A1 * | 4/2006 | McElvain | G06F 17/5045 716/116 |

(Continued)

OTHER PUBLICATIONS

International Searching Authority, "Notification of Transmittal of the International Search Report and the Written Opinion of the International Searching Authority," mailed Jul. 30, 2012 in International application No. PCT/2011/066355.

*Primary Examiner* — John B King
*Assistant Examiner* — Carlos Amorin
(74) *Attorney, Agent, or Firm* — Trop, Pruner & Hu, P.C.

(57) ABSTRACT

In one embodiment, the present invention includes a system on a chip (SoC) that has a first agent with an intellectual property (IP) logic, an interface to a fabric including a target interface, a master interface and a sideband interface, and an access control plug-in unit to handle access control policy for the first agent with respect to incoming and outgoing transactions. This access control plug-in unit can be incorporated into the SoC at integration time and without any modification to the IP logic. Other embodiments are described and claimed.

20 Claims, 8 Drawing Sheets

(56) References Cited

U.S. PATENT DOCUMENTS

| | | | | |
|---|---|---|---|---|
| 2007/0124717 A1* | 5/2007 | Deur | G06F 21/14 | 716/103 |
| 2008/0288652 A1* | 11/2008 | De Sousa | G01R 31/31851 | 709/230 |
| 2009/0080651 A1* | 3/2009 | Banerjee | G06F 12/14 | 380/46 |
| 2009/0300245 A1* | 12/2009 | Shoemaker | G06F 13/385 | 710/105 |
| 2010/0005213 A1 | 1/2010 | Butter et al. | | |
| 2010/0057400 A1* | 3/2010 | Chou | G06F 11/3466 | 702/182 |
| 2010/0211935 A1* | 8/2010 | Weber | H04L 12/5695 | 717/127 |
| 2010/0246594 A1* | 9/2010 | Klinglesmith | H04L 12/6418 | 370/419 |
| 2011/0067114 A1* | 3/2011 | Weber | G06F 21/78 | 726/28 |
| 2012/0079590 A1* | 3/2012 | Sastry | G06F 12/1458 | 726/21 |
| 2012/0089699 A1* | 4/2012 | Cholas | H04L 12/2812 | 709/217 |
| 2012/0102334 A1* | 4/2012 | O'Loughlin | G06F 21/57 | 713/189 |
| 2012/0117301 A1* | 5/2012 | Wingard | G06F 12/1027 | 711/6 |
| 2013/0083794 A1 | 4/2013 | Lakshmanamurthy | | |
| 2013/0083798 A1* | 4/2013 | Lakshmanamurthy | H04L 69/22 | 370/392 |
| 2013/0086139 A1 | 4/2013 | Lakshmanamurthy | | |
| 2013/0086288 A1 | 4/2013 | Lakshmanamurthy | | |
| 2013/0086296 A1 | 4/2013 | Lakshmanamurthy | | |
| 2013/0086433 A1 | 4/2013 | Lakshmanamurthy | | |
| 2013/0086586 A1 | 4/2013 | Lakshmanamurthy | | |
| 2013/0124874 A1* | 5/2013 | Kudelski | G06F 21/70 | 713/189 |
| 2013/0138858 A1 | 5/2013 | Lakshmanamurthy | | |

\* cited by examiner

INCORPORATING ACCESS CONTROL FUNCTIONALITY INTO A SYSTEM ON A CHIP (SOC)

BACKGROUND

Security issues relating to computer systems have become an ever increasing problem. Viruses, malware, and the like are common threats. Antivirus and other security software are used to address such security attacks, which are targeted at the software level. Although less common, security attacks can also be made at the hardware level. However, there is no equivalent to security software to prevent access to system-level hardware resources and assets, such as configuration registers, range registers, and the like. As a result, system architects design in various hardware- and firmware-based security measures for controlling access to important system resources. This is typically done on a per-system basis, leading to replication of design, debug, and validation work and inconsistent management of security across system designs.

Ever increasing numbers of semiconductor chips are formed as system-on-chips (SoCs). Logic blocks, often referred to as an intellectual property (IP) block, developed for SoCs are built such that they can be reused in multiple products. Access control requirements for protecting assets within the IP block are determined when that IP block is integrated into a particular SoC. For example, the access control requirements vary depending on whether the SoC is incorporated into a smartphone or a netbook platform.

Supporting access control in an IP logic block dictates that the block be able to evaluate security attributes in an incoming transaction and enforce the specified access control policy to permit or deny access to assets within the IP block. For an IP block having a simple interface, access control policy may be implemented as a wrapper external to the IP block. However, for more complex IP blocks, e.g., according to a credit-based interface that tracks requests and responses, incorporating such a wrapper can be non-trivial.

DETAILED DESCRIPTION

Embodiments provide a mechanism to allow access control requirements for an IP block to be configured during SoC integration time by providing access control functionality independently of the IP block. In this way, a SoC designer can incorporate any manner of IP block into the SoC and provide access control policies without the need to re-design the IP block. More specifically, embodiments define an access control (AC) plug-in to provide access control for an IP block. The AC plug-in acts as a gatekeeper to protect against unauthorized accesses by SoC agents to assets within the IP block. An additional feature of the plug-in is the ability to configure the granularity of the assets within the IP block. For example, all registers inside the IP block can be treated as one asset, or the registers can be grouped into multiple partitions and access can be enforced at a finer-grained level. The overall objective of the plug-in is to provide flexibility to configure assets and an access control policy as per the requirements of the SoC.

In one embodiment, the plug-in can include a security attributes generator, a policy enforcer, a completion logic, and an asset grouping logic. The security attributes generator may be logic of the plug-in responsible for generating hardware security attributes that identify the SoC agent. In some embodiments, these attributes accompany all transactions generated by an agent within the SoC.

In one embodiment, security attributes are assigned to initiator agents and used to determine the access rights (e.g., read, write, no access, etc.) of such agent. These Security Attributes of the Initiator or SAI represent immutable properties of the initiator used by a recipient for making access decisions. Unlike source IDs, SAIs are not transformed at bridges; they persist until the point of policy enforcement.

Each initiator agent can be assigned a set of security attributes that define the access rights of each initiator as enforced by the SAI security scheme via associated policy registers. Information effecting the set of security attributes applicable to an agent is forwarded with each access message initiated by the agent. The policy registers store security attributes data for securely controlling access to corresponding objects. If the security attributes of a source or initiator agent match the security attributes to access an object, the transaction is allowed to proceed. Conversely, if an initiator agent does not have the proper security attributes (as identified via its SAI information forwarded with its access message), the transaction is denied, and in some embodiments a corresponding message can be returned to the initiator agent.

In one embodiment, the immutable properties of the initiator agent include a role, device mode and system mode. An initiator may have any combination of these properties. A role is assigned to a group of subjects/initiators with similar privileges. The device mode is dynamic and captures the current internal mode of a device. For example, the mode could be a secure or normal mode. The system mode is dynamic and indicates the mode driven, e.g., by a processor core. For example, the system mode may be a secure mode such as system management mode (SMM). Additionally, for multi-threaded initiators, a context attribute for indicating the current thread can be defined and may accompany the SAI.

SAI is thus an encoding that is generated by SoC hardware via a function whose input parameters include role, device and system mode. The interpretation of an SAI is specific to each SoC, and can be defined by the SoC architect. As an example implementation, under an example 7-bit SAI encoding, bit 6 set to 1 could indicate an access by a processor core. If bit 6 is set to 0, then bits 5-0 could be used for encoding device accesses. For example, 1000001b represents core access and 0010000b represents a device access. Of course, this is merely exemplary, as the number of bits and format of the SAI encoding may be configured by the architect.

The policy enforcer may be configured to evaluate security attributes in an incoming transaction and its requested action (e.g., read or write) and based on the specified permissions allow or deny access to the asset within the IP block. In one embodiment, the policy enforcer may include read, write and control policy registers. The read and write policy registers contain permissions for read and write transactions, respectively.

The SAI accompanying the transaction serves as an index to the appropriate policy register. As an example, in one embodiment 32-bit read and write policy registers may be present in which a logic one value indicates access is allowed and a logic 0 value indicates access is denied for the corresponding identifier. In general, the SAI width is n-bits. The value of n may change from one generation to another and/or differ between products. In one embodiment the encoding space is $2^{n-1}$, where one of the n bits is used to differentiate core vs. device encodings.

In turn, the control policy register identifies the privileged agent that can configure the read and write policy registers. The control policy register is a self-referential register; the SAI specified in the control policy register is allowed to modify the read and write policy register policies as well as overwrite the contents of the control policy register. By allowing a single trusted entity to configure the control policy register, access to the policy registers is locked to all other agents. The entity specified by the SAI in the control policy register may extend the set of agents that can configure the policy registers beyond the initial value loaded at power-on/reset, or the trusted entity may write 0s into the control policy register, thus locking it until the next system reset/power-on. This provides flexibility for the SoC architect to implement locking down the policy registers until the next reset or allow the policy to be updated by a trusted entity during runtime.

The completion logic may be used to generate a successful or unsuccessful response based on operation of the policy enforcer. Additionally, it may insert the security attributes of the target IP block so that an initiator agent can verify the source of a response to a transaction.

The AC plug-in can treat all transactions the same and define a single policy register for all assets. For simple IPs this may be sufficient asset protection. On the other hand, the plug-in can treat transactions differently based on the register access type. For example, the plug-in can have a different policy register for Peripheral Component Interconnect (PCI) configuration register read/write operations, input/output (I/O) mapped register read/write and so forth. Such different policy registers can be accommodated using asset grouping logic.

Figure 1:
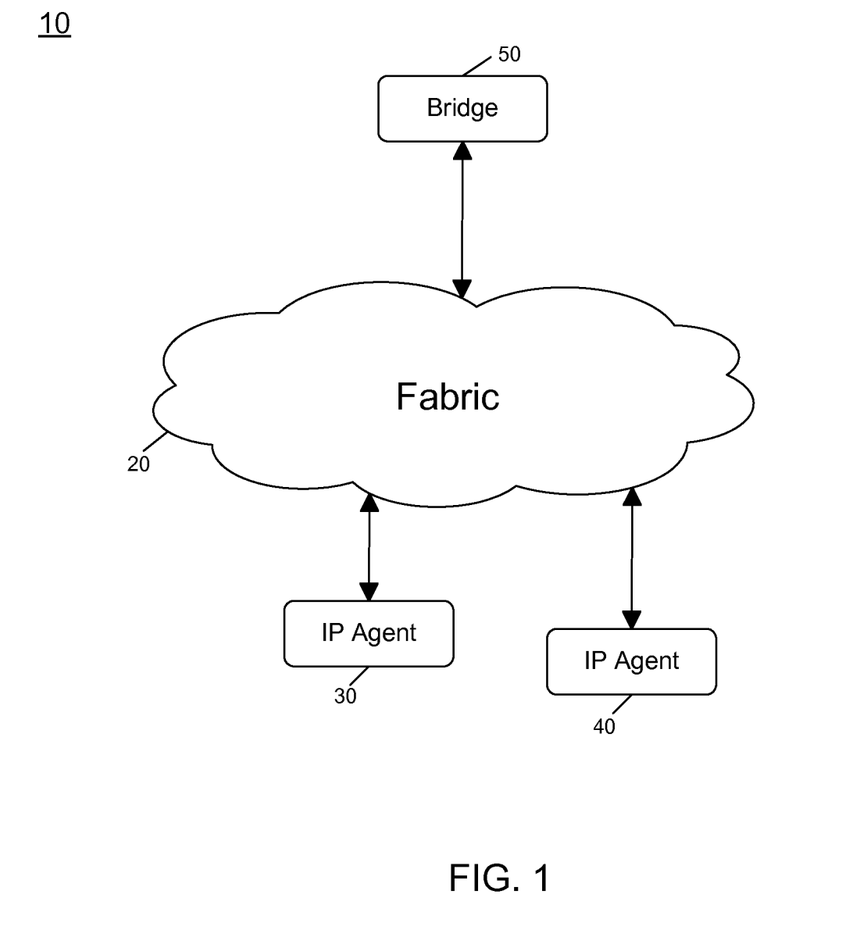
FIG. 1 is a block diagram of a basic interconnect architecture in accordance with an embodiment of the present invention.

To understand implementation of access control logic into a SoC it is instructive to analyze a representative SoC in accordance with a given protocol. Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with an integrated on-chip system fabric (IOSF) specification. This specification can be issued by a semiconductor manufacturer to provide a standardized on-die interconnect protocol for attaching IP blocks within a chip. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
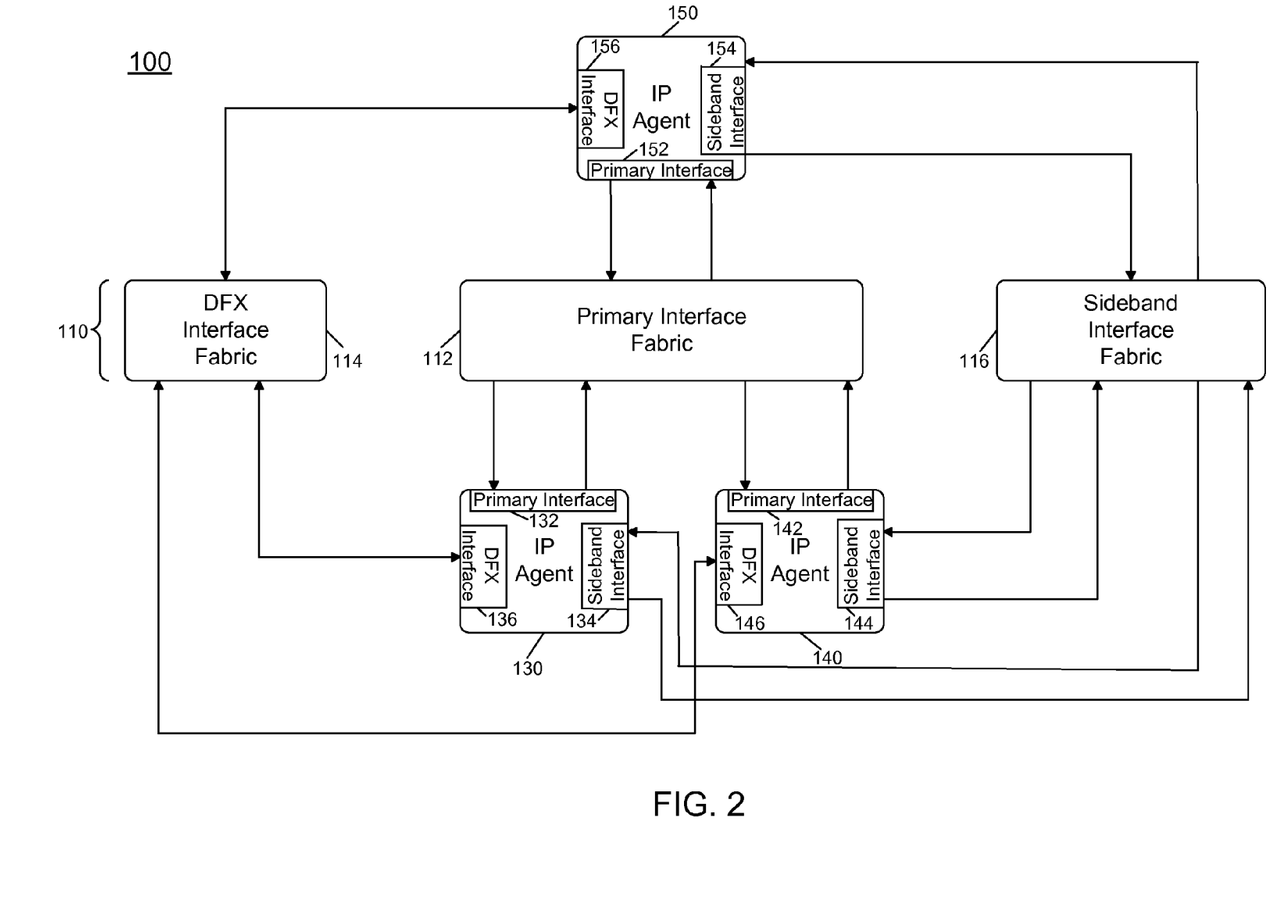
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
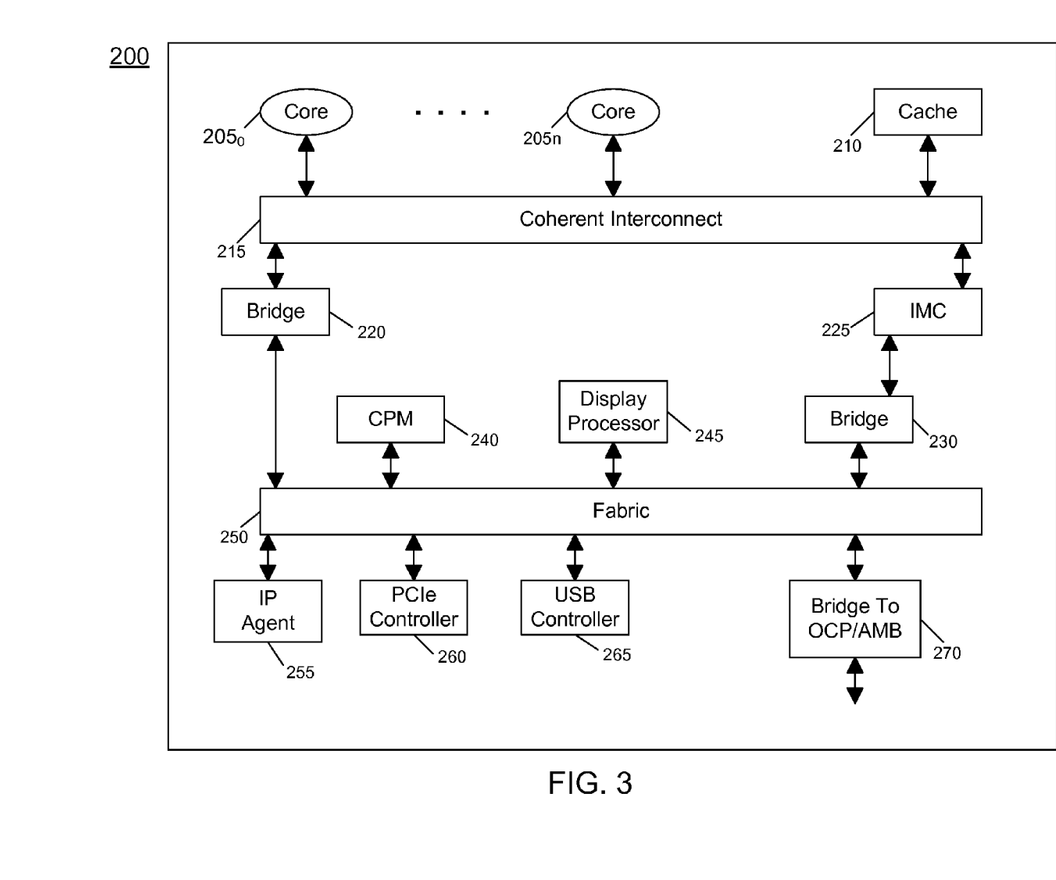
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
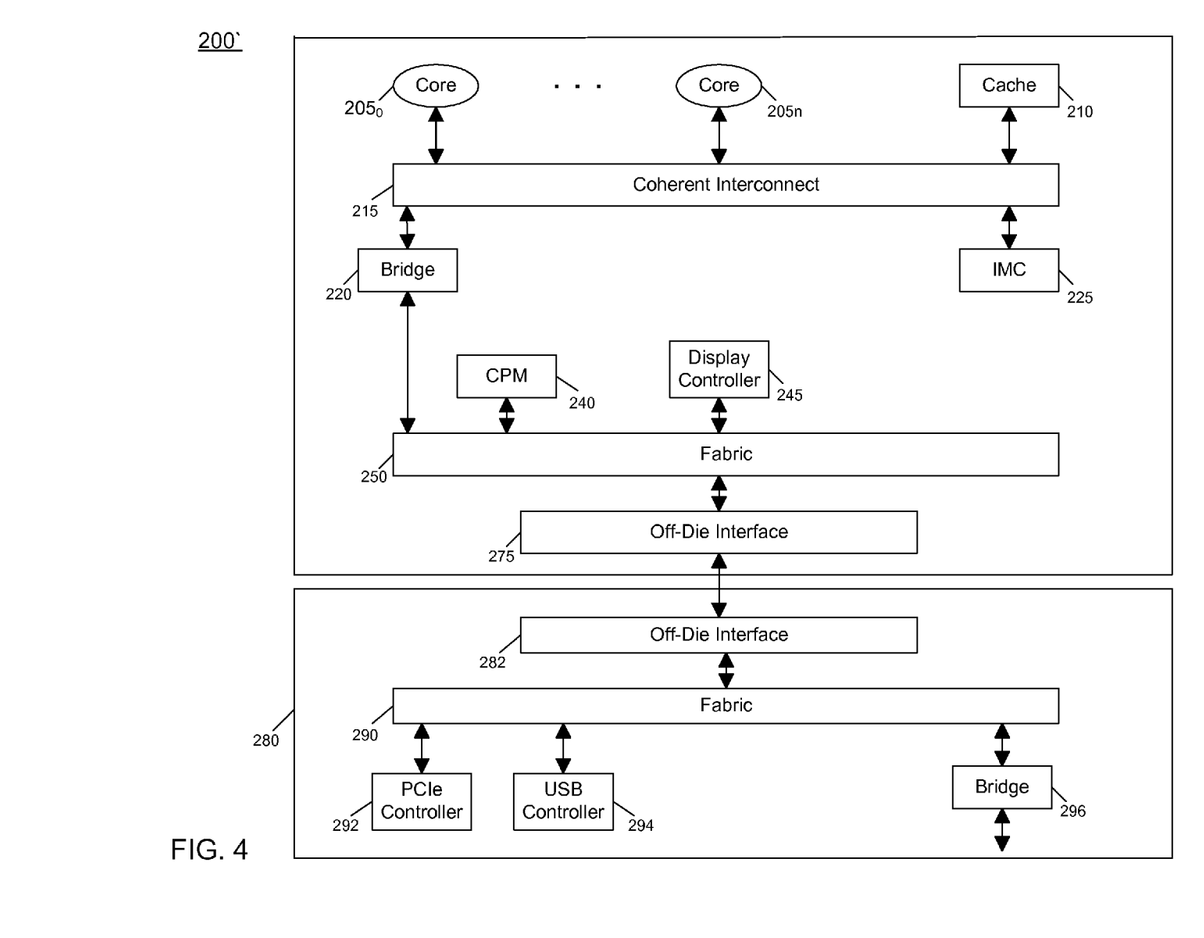
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
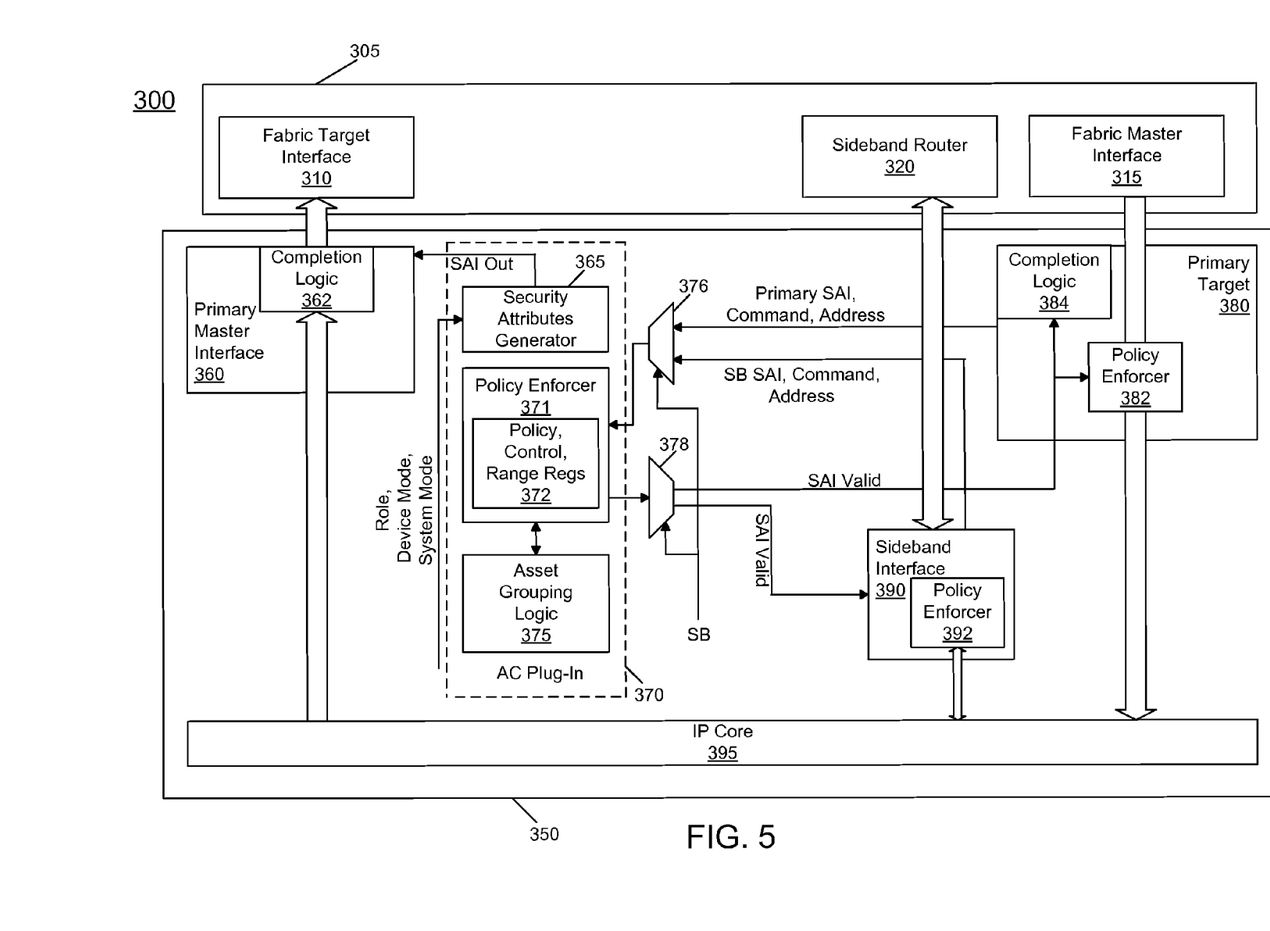
FIG. 5 is a block diagram of an access control architecture in accordance with an embodiment of the present invention.

Note that the above SoC implementations are at a high level and do not show access control circuitry, which in general can be provided as a plug-in feature to every agent of the SoC. Referring now to FIG. 5, shown is a block diagram of an access control architecture in accordance with an embodiment of the present invention. As shown in FIG. 5, a portion of an SoC 300 includes an interface between a fabric and an IP logic block. More specifically, fabric 305 (which can be an IOSF fabric) includes a target interface 310, a master interface 315, and a sideband router 320. Each of these different interfaces can be in communication with an IP agent 350. In general, IP agent 350 which can be any type of logic block including a fixed function unit, general-purpose processor core or so forth, includes an IP core 395, which may be the main processing circuitry of the IP agent.

In addition, to provide interface with the fabric shown in FIG. 5, agent 350 further includes a primary master interface 360, a primary target interface 380 and a sideband interface 390. Each of these interfaces can include access control circuitry in accordance with an embodiment of the present invention. Additional access control circuitry can be provided via an AC plug-in 370.

First with reference to the interface circuitry, for outgoing communications via master interface 360, a completion logic 362 can be provided to enable insertion of completion response messages for incoming non-posted messages that are denied. For incoming communications from fabric master interface 315, a policy enforcer 382 may be present within the primary target interface 380 to determine whether to allow transactions to proceed to IP core 395. A similar policy enforcer 392 may be present with regard to sideband interface 390. In addition, primary target interface 380 can further include completion logic 384. Completion logic 384 may be used to extract message attributes used to form a completion message for denied non-posted messages. Completion logic 362 can be used to insert the completion into the primary interface.

In addition to this logic provided within the interfaces, access control can be handled via AC plug-in 370, which as seen in the embodiment of FIG. 5 includes a security attributes generator 365, a policy enforcer 371 and an asset grouping logic 375. AC plug-in 370 inserts SAIs for all outgoing messages including response messages and may limit the scope of possible SAI values the IP block can send out. In the embodiment of FIG. 5, policy enforcer 371 includes policy registers, one or more control policy registers, and range registers (generally 372). Range registers 372 allow an IP block to define specific sets of registers (a "range" of registers/addresses) to be protected by the policy registers.

To interface with the circuitry within the primary target and sideband interfaces, an output multiplexer 378 can be provided to enable communications to sideband interface 390 and primary target interface 380, respectively, depending on the type of communication. Still further, incoming security information, which can include, in one embodiment, the SAI, command information and address information, can be provided through input multiplexer 376 to policy enforcer 371 to determine whether access is to be permitted. Note that both multiplexers and accordingly the access control mechanisms can be controlled depending upon the operative transaction. Specifically, the multiplexers can be used to accommodate both communication channels: primary and sideband (SB). That is, messages can target IP core 395 on both interfaces concurrently. The SB signal can be used to determine which channel is to be provided with priority, and thus is to be processed first, since assets may be shared across both channels and may only service one message at a time. Although shown with this particular implementation in the embodiment of FIG. 5, understand the scope of the present invention is not limited in this regard.

An SoC architect can configure an AC plug-in unit for unique IP-specific requirements, by defining parameters such as the number of assets to be protected within the IP logic block, address ranges for the assets as well as the policy registers, policy values associated for each asset, policy value to include debug agents' attributes for audit operations and so forth.

Figure 6:
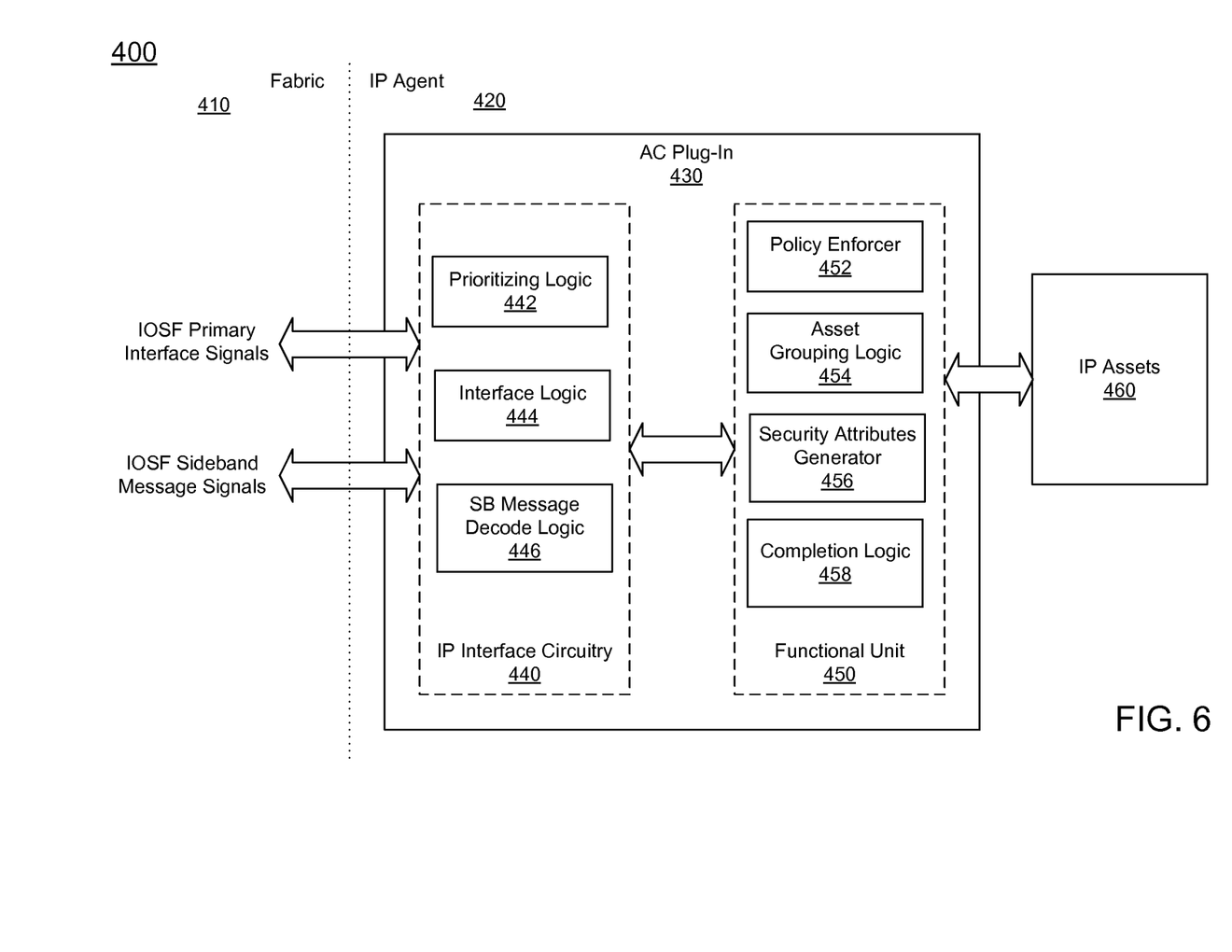
FIG. 6 is a block diagram of further details of an access control plug-in module in accordance with an embodiment of the present invention.

Referring now to FIG. 6, shown are further details of an access control plug-in module in accordance with an embodiment of the present invention. As shown in FIG. 6, plug-in module 430 may logically and physically reside within a given IP agent, namely between an interface of the IP agent to a fabric (although this interface is not shown for ease of illustration in the embodiment of FIG. 6) and one or more assets, which can correspond to IP cores, logic blocks or other circuitry of the agent. A representative asset is shown as IP asset 460. Accordingly, communications can occur between IP agent 420 and fabric 410 via plug-in module 430.

In the embodiment of FIG. 6, plug-in module 430 can include IP interface circuitry 440, which generally may provide for an interface between the IP agent and a given fabric. In addition, module 430 can include a functional unit 450 which can generally perform the security functionality of the access control module.

Specifically in the embodiment of FIG. 6, IP interface circuitry 440 can include a prioritizing logic 442, an interface logic 444, and a message decoding logic 446, which may be a message decoding logic for a sideband interface, although the scope of the present invention is not limited in this regard. In general, IP interface circuitry 440 may be primarily responsible for interfacing with an interface of the IP block (e.g., primary and sideband interfaces to the IP block). The circuitry handles the sideband endpoint message protocol, decodes incoming transactions, and passes pertinent information on to the functional unit. In one embodiment, the circuitry can further handle sending completion messages with data over the sideband endpoint for policy audits. Still further, the circuitry may also prioritize whether a primary or sideband request is permitted to access the IP assets, in case of conflict.

Still referring to FIG. 6, IP interface circuitry 440 can be in communication with a functional unit 450 which may perform various access control operations. In the embodiment of FIG. 6, this unit can include a policy enforcer 452, an asset grouping logic 454, a security attributes generator 456, and a completion logic 458. Functional unit 450 may encapsulate all these plug-in components discussed above. In one embodiment, functional unit 450 may gate all read/write operations made to IP assets 460 based on attributes for the transaction (e.g., address, SAI, read/write) and policy register contents for the asset. Functional unit 450 may also be configured to perform sophisticated access control mechanisms such as dynamic policy configuration to enable on-the-fly revision of policy values linked to an asset, and a policy audit feature for any debug-related applications, in which an entire array of policy values can be read from the corresponding IP block. Although described with this implementation in the embodiment of FIG. 6, understand the scope of the present invention is not limited in this regard.

Thus in contrast to conventional mechanisms in which access control is built into an IP block and design changes are required on a per SoC basis, embodiments provide a plug-in to enable interfacing to unmodified IP blocks when designed into a given SoC. As such, no design changes are needed to an IP block such as a shared static random access memory (SRAM) that hard codes a number of regions when incorporated into a specific SoC having certain security requirements.

Figure 7:
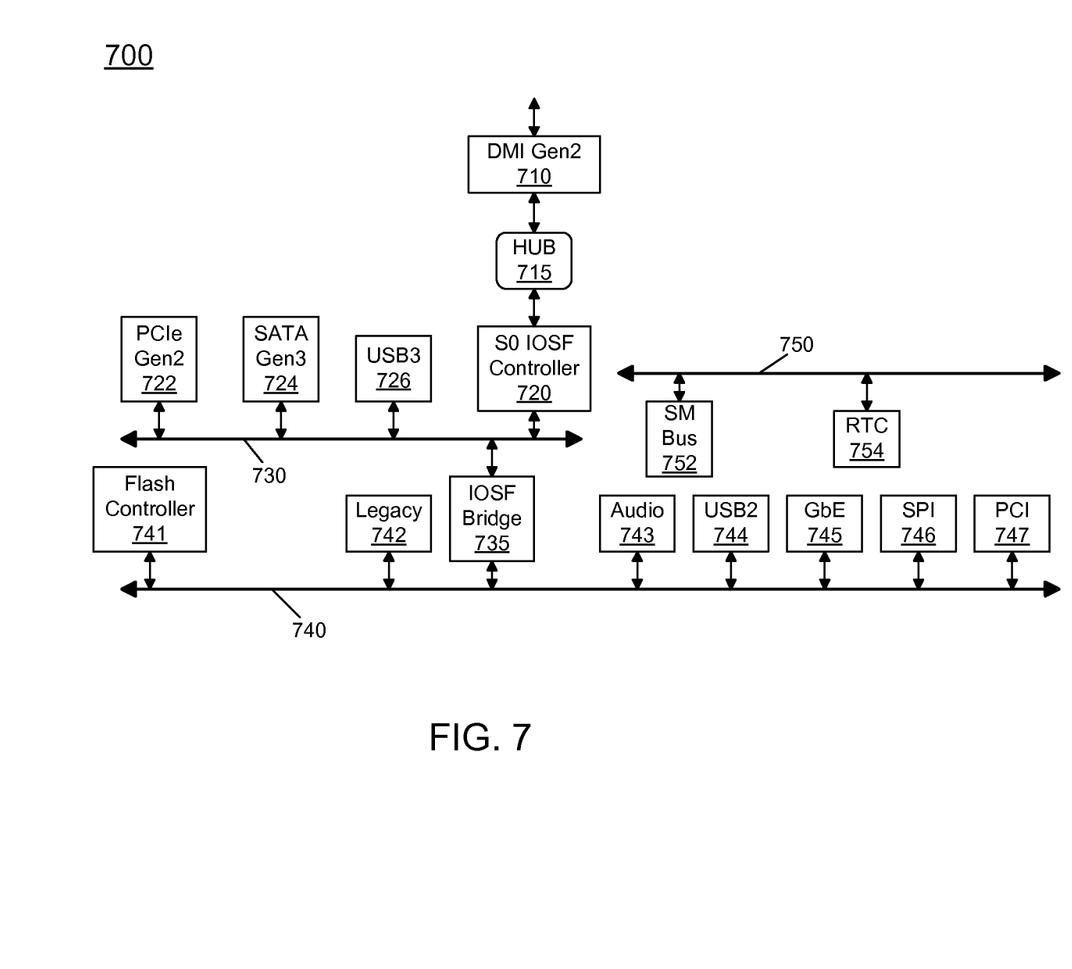
FIG. 7 is a more detailed block diagram of a portion of a SoC in accordance with an embodiment of the present invention.

Although the SoCs of FIGS. 3 and 4 are at a high level, understand that additional functionality may be present. Referring now to FIG. 7, shown is a more detailed block diagram of a portion of a SoC in accordance with an embodiment of the present invention. As shown in FIG. 7, the portion of SoC 700 shown may correspond to non-core portions coupled below a memory controller hub or other interface logic that can in turn interface to multiple processor cores, as well as to system memory.

Thus as seen, an off-die interface 710 (which in one embodiment can be a direct media interface (DMI)) may couple to a hub 715, e.g., an input/output hub that in turn provides communication between various peripheral devices. Although not shown for ease of illustration in FIG.

7, understand that various engines such as a manageability engine and a virtualization engine can also be directly coupled to hub 715.

To provide connection to multiple buses, which may be multi-point or shared buses in accordance with the IOSF specification, an IOSF controller 720 may couple between hub 715 and bus 730, which may be an IOSF bus that thus incorporates elements of the fabric as well as routers. In the embodiment shown in FIG. 7, first IOSF bus 730 may have coupled to it various controllers to provide for control of off-chip devices. Specifically, seen is a PCI controller 722, a SATA controller 724, and a USB controller 726. In turn, a second IOSF bus 750 may couple to a system management bus 752 and to a real time clock 754.

As further seen in FIG. 7, first IOSF bus 730 may couple to an IOSF bridge 735 for both primary and sideband information that in turn provides interconnection to a third bus 740, e.g., of a different protocol, to which various controllers and components may be attached. In the embodiment shown in FIG. 7, such components include a flash controller 741 to provide an interface to a non-volatile memory, a legacy device 742, which may implement various legacy functions, e.g., of a PCI specification and further may include an interrupt controller and timer. In addition, interfaces for audio 743, USB 744, gigabyte Ethernet (GbE) 745, serial peripheral interface (SPI) 746 and PCI 747 may all be provided. Although shown with this particular implementation in the embodiment of FIG. 7, understand the scope of the present invention is not limited in this regard.

Figure 8:
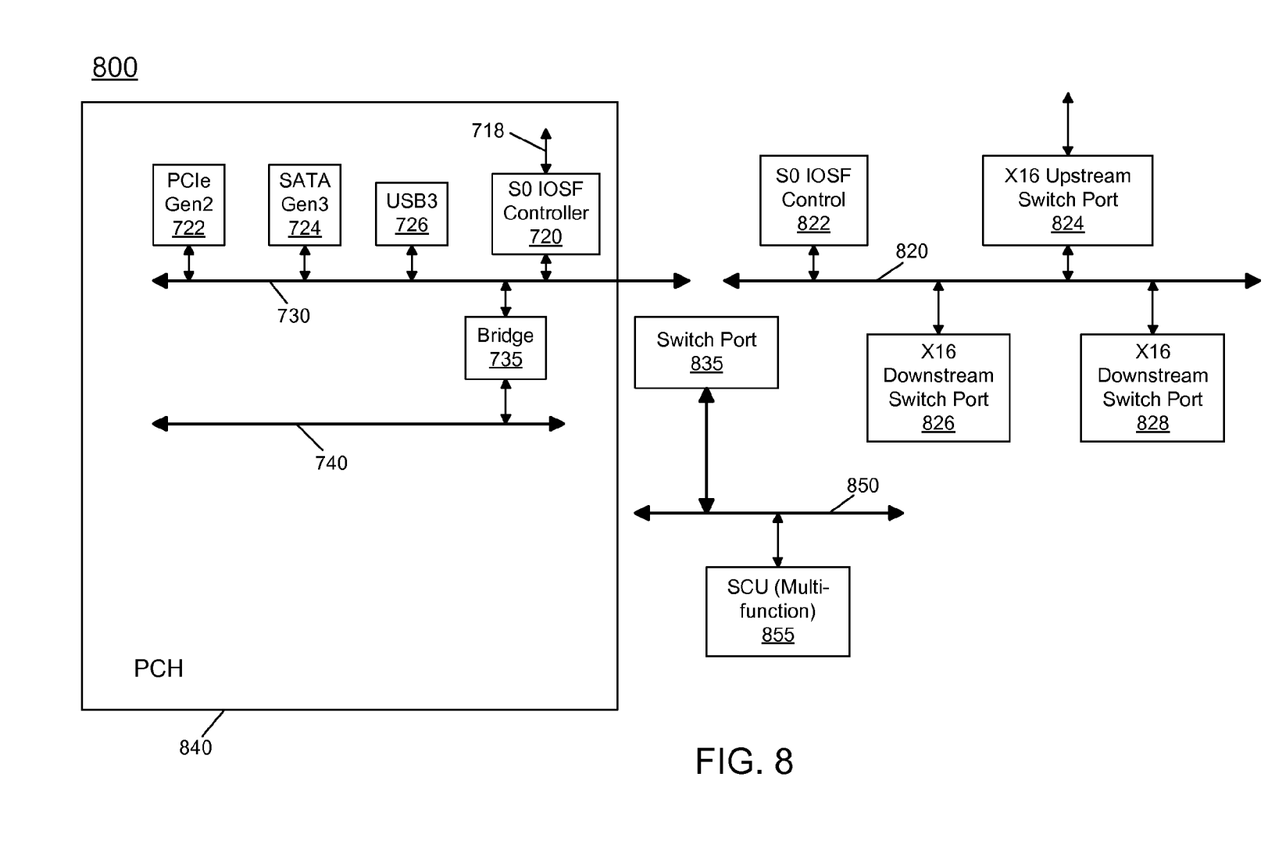
FIG. 8 is a block diagram of another SoC in accordance with an embodiment the present invention.

Still other implementations are possible. Referring now to FIG. 8, shown is a block diagram of another SoC in accordance with an embodiment the present invention. As shown in FIG. 8, SoC 800 may be configured for use, e.g., in server systems. As seen in FIG. 8, SoC may include a platform controller hub (PCH) 840, which may generally include components such as seen in the embodiment of FIG. 7. Namely, multiple IOSF buses 730 and 740 may be present, along with a bridge 735 to couple the buses. Bus 730 may include various agents coupled to it, including a PCIe controller 722, SATA controller 724, and a USB controller 726. In turn, via an IOSF controller 720, communication may occur via an additional bus 718, which may communicate with upstream devices, such as cores or other processing units (not shown for ease of illustration in the embodiment of FIG. 8).

As further seen in FIG. 8, for providing communications with other server-based components, an additional IOSF bus 820 may be provided, which in turn can communicate with an IOSF controller 822 and an upstream switch port 824 (e.g., an X16 port) that may be coupled to an upstream bus 825. Also coupled to bus 820 may be multiple downstream switch ports 826 and 828.

Furthermore, to enable communications, e.g., with storage units of a server-based system, a switch port 830 may couple between bus 820 and another IOSF bus 850, which in turn may be coupled to a storage controller unit (SCU) 855, which may be a multi-function device for coupling with various storage devices.

Embodiments may be implemented in code and may be stored on a storage medium having stored thereon instructions which can be used to program a system to perform the instructions. The storage medium may include, but is not limited to, any type of non-transitory storage including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving a transaction initiated by an initiator agent of a system on a chip (SoC) to access a target agent of the SoC in a target interface of the target agent;
providing security attributes of the transaction from the target interface to an access control logic associated with and included in the target agent as a plug-in module and incorporated into the target agent of the SoC without modification of an intellectual property (IP) block of the target agent, the access control logic located in the target agent between the target interface and a core of the target agent, the security attributes defining access privileges associated with the initiator agent that are evaluated against an access policy defined for the target agent, the initiator agent further comprising a second access control logic associated with and included in the initiator agent as a plug-in module and incorporated into the initiator agent of the SoC without modification of an IP block of the initiator agent; and
allowing the transaction to proceed to the core of the target agent from the target interface of the target agent if the access control logic determines that the security attributes indicate access to the target agent by the initiator agent is permitted by the access policy, and otherwise preventing the transaction from proceeding to the core of the target agent from the target interface.

2. The method of claim 1, further comprising enforcing the access policy via read and write policy registers of the access control logic.

3. The method of claim 1, further comprising employing a single trusted entity to control access to access policy data stored in a control policy register of the access control logic.

4. The method of claim 1, further comprising inserting, via the access control logic, security attributes of the target agent onto a response to the transaction sent from the target agent to the initiator agent.

5. The method of claim 1, further comprising allowing a first transaction from the target agent to access a first asset of the target agent based on the security attributes of the first transaction and a first policy of the access control logic.

6. The method of claim 5, further comprising preventing a second transaction from the target agent from access to the first asset of the target agent based on the security attributes of the second transaction and a second policy of the access control logic.

7. The method of claim 6, further comprising storing the first policy in a first policy register of the access control logic and storing the second policy in a second policy register of the access control logic.

8. The method of claim 1, further comprising enforcing access control by assigning a role to each initiator agent in the SoC, each role defining access privileges associated with the role, wherein the security attributes provided with transactions initiated by a given initiator agent include information identifying the role associated with the initiator agent.

9. An apparatus comprising:
a system on chip (SoC) formed on a single semiconductor die and comprising:
a first agent including an intellectual property (IP) logic, an interface to a fabric including a target interface to receive incoming transactions, a master interface and a sideband interface, and an access control plug-in unit included in the first agent to handle access control policy for the first agent with respect to the incoming transactions and outgoing transactions, wherein the target interface is to provide security attributes of the incoming transactions to the access control plug-in unit and thereafter send the incoming transactions to the IP logic if permitted by the access control plug-in unit, the first agent incorporated into the apparatus in an unmodified state; and
the fabric coupled to the first agent, the fabric including a primary interface to interface with the target and master interfaces of the first agent and a sideband interface to interface with the sideband interface of the first agent.

10. The apparatus of claim 9, wherein the access control plug-in unit includes an interface unit to interface with the target interface, the master interface, and the sideband interface, and a functional unit to perform access control according to the access control policy.

11. The apparatus of claim 10, wherein the interface unit includes a prioritization logic and a message decode logic.

12. The apparatus of claim 10, wherein the functional unit includes a policy enforcer to receive an incoming transaction and to enforce the access control policy with respect to the incoming transaction, the policy enforcer including a write policy register and a read policy register, wherein the policy enforcer is to access one of the write policy register and the read policy register to determine whether to allow the first transaction to be provided to the IP logic.

13. The apparatus of claim 12, wherein the functional unit includes an asset grouping logic to enable the policy enforcer to handle a first transaction directed to a first portion of the IP logic according to a first policy and to handle a second transaction directed to a second portion of the IP logic according to a second policy.

14. The apparatus of claim 12, wherein the read policy register and the write policy register each is to store a multi-field value to indicate whether a corresponding agent is allowed to perform a read or write access, respectively, with regard to the first agent.

15. The apparatus of claim 10, further comprising a control policy register configured to store data to identify a trusted entity that is allowed to configure the read and write policy registers.

16. The apparatus of claim 10, wherein the functional unit includes a security attributes generator to apply security attributes associated with the first agent onto an outgoing transaction from the first agent.

17. The apparatus of claim 10, wherein the functional unit includes a completion logic to insert security attributes of the first agent onto a response to an incoming transaction so that an initiator agent of the incoming transaction can verify a source of the response.

18. A system on a chip (SoC) comprising:
a master agent to send a transaction to a target agent, the transaction including security attributes of the master agent, the master agent further including a plug-in module to generate the security attributes, wherein the master agent is incorporated into the SoC in an unmodified state;
a fabric coupled to the master agent and the target agent; and
the target agent coupled to the fabric via an interface of the target agent, the target agent further including a plug-in module located between the interface of the target agent and a core of the target agent, the plug-in module comprising an access control unit having an interface circuit to interface with the target agent interface and a functional unit to perform access control on behalf of at least a first asset and a second asset of the target agent, the first asset having a first access control policy associated therewith and the second asset having a second access control policy, wherein the target agent is incorporated into the SoC in an unmodified state and the target agent interface is to provide the security attributes to the access control unit and thereafter forward the transaction to one of the first asset and the second asset of the target agent if the access control unit permits the transaction to be forwarded.

19. The SoC of claim 18, wherein the interface circuit comprises a prioritization logic and a message decode logic.

20. The SoC of claim 18, wherein the functional unit comprises:
a policy enforcer to receive the transaction and to enforce access control with respect to the transaction, the policy enforcer including a write policy register and a read policy register, wherein the policy enforcer is to access one of the write policy register and the read policy register to determine whether to allow the transaction to be provided to one of the first and second assets;
an asset grouping logic to enable the policy enforcer to handle the transaction if directed to the first asset according to the first access control policy and to handle the transaction if directed to the second asset according to the second access control policy;
a security attributes generator to apply security attributes associated with the target agent onto an outgoing transaction from the target agent; and
a completion logic to insert security attributes of the target agent onto a response to the transaction so that the master agent can verify a source of the response.

* * * * *